United States Patent
Morales et al.

(10) Patent No.: US 11,423,267 B2
(45) Date of Patent: Aug. 23, 2022

(54) COLOR MEASUREMENT SYSTEM FOR PRINTING DEVICES

(71) Applicant: Kyocera Document Solutions, Inc., Osaka (JP)

(72) Inventors: Javier A. Morales, Rochester, NY (US); Steve A. Doria, Los Angeles, CA (US); Michael M. Chang, El Segundo, CA (US); Mohamed Mostafa, Hawthorne, CA (US)

(73) Assignee: Kyocera Document Solutions, Inc., Osaka (JP)

( * ) Notice: Subject to any disclaimer, the term of this patent is extended or adjusted under 35 U.S.C. 154(b) by 0 days.

(21) Appl. No.: 17/106,418

(22) Filed: Nov. 30, 2020

(65) Prior Publication Data

US 2022/0172012 A1 Jun. 2, 2022

(51) Int. Cl.
*G06K 15/02* (2006.01)
*G06F 3/12* (2006.01)
*H04N 1/60* (2006.01)
*G06K 15/12* (2006.01)
*G06K 15/00* (2006.01)

(52) U.S. Cl.
CPC ......... *G06K 15/027* (2013.01); *G06K 15/005* (2013.01); *G06K 15/007* (2013.01); *G06K 15/021* (2013.01); *G06K 15/129* (2013.01); *G06K 15/408* (2013.01)

(58) Field of Classification Search
None
See application file for complete search history.

(56) References Cited

U.S. PATENT DOCUMENTS

| | | | | | |
|---|---|---|---|---|---|
| 4,955,290 | A | * | 9/1990 | Kipphan | B41F 33/0009 101/183 |
| 6,972,867 | B1 | * | 12/2005 | Venable | H04N 1/6033 358/1.9 |
| 8,014,024 | B2 | | 9/2011 | Viturro et al. | |
| 10,460,161 | B1 | * | 10/2019 | Lauer | G06K 9/00442 |
| 10,789,517 | B2 | * | 9/2020 | Yamamoto | H04N 1/6033 |
| 2003/0217662 | A1 | * | 11/2003 | Koifman | H04N 1/4078 101/484 |
| 2005/0200646 | A1 | * | 9/2005 | Deer | G03G 15/5062 347/20 |
| 2007/0177237 | A1 | * | 8/2007 | Sasanuma | G01J 3/463 358/518 |

(Continued)

FOREIGN PATENT DOCUMENTS

JP 2016024006 * 2/2016 ............ B41J 29/46

*Primary Examiner* — Beniyam Menberu
(74) *Attorney, Agent, or Firm* — Millen, White, Zelano & Branigan, P.C.; William Nixon

(57) ABSTRACT

A color management system for a printing system includes a color management service that controls quality control operations, such as calibration and quality checks, over a plurality of printing devices. The color management service generates a target print job having a quality control target made of color patches. The color management service also encodes metadata within the target print job using a control strip. The control strip encodes the metadata using different color patches and color intensities. The control strip is scanned at the printing device to decode the metadata and enable a user interface to complete the quality control operation.

19 Claims, 9 Drawing Sheets

(56) References Cited

U.S. PATENT DOCUMENTS

| | | | |
|---|---|---|---|
| 2008/0204773 A1* | 8/2008 | Morgana | H04N 1/6033 |
| | | | 358/1.9 |
| 2009/0316234 A1* | 12/2009 | Yamamoto | H04N 1/6033 |
| | | | 358/505 |
| 2011/0176155 A1* | 7/2011 | Toriyabe | H04N 1/00063 |
| | | | 358/1.9 |
| 2014/0192358 A1* | 7/2014 | Barbieri | G01J 3/46 |
| | | | 356/402 |
| 2017/0280022 A1* | 9/2017 | Kuroiwa | H04N 1/6097 |
| 2017/0314994 A1* | 11/2017 | Tanimura | G01J 3/463 |
| 2019/0095147 A1* | 3/2019 | Yano | G06F 3/1234 |
| 2020/0034672 A1* | 1/2020 | Konishi | G06K 15/1872 |
| 2020/0070540 A1* | 3/2020 | Kobayashi | H04N 1/00074 |

* cited by examiner

| Bl | Cy | Bl | Re | Gr | Cy | Cy | Ye | Gr | Bl | Ma | Ma | Gr | Bl | Gr | Ma | Ye | Bl | Cy | Re |
|----|----|----|----|----|----|----|----|----|----|----|----|----|----|----|----|----|----|----|----|
| 1  | 2  | 3  | 4  | 5  | 6  | 7  | 8  | 9  | 10 | 11 | 12 | 13 | 14 | 15 | 16 | 17 | 18 | 19 | 20 |

COLOR MEASUREMENT SYSTEM FOR PRINTING DEVICES

FIELD OF THE INVENTION

The present invention relates to an adaptive color measurement system for one or more printing devices that includes metadata for facilitating automated measurement of target print jobs for the printing devices.

DESCRIPTION OF THE RELATED ART

Process control is a task that every printing system and shop require and struggle to perform on a consistent basis. This situation may be especially true for environments such as franchise printing devices that have to deal with high turnover as well as operators that are not highly skilled or dedicated to the printing device. For example, an operator may receive a few minutes of training on a production printing device, which includes training on how to use cash registers and make sales in a commercial setting. Automated color management may help these print environments better control their color reproduction process. Unless the print shop, however, adds inline spectrophotometers to all devices, this process still requires that the operator properly performs the measurement task.

SUMMARY OF THE INVENTION

A method for adaptive color measurement within a printing system is disclosed. The method includes generating a target print job for a quality control operation at a printing device by determining a paper media for the quality control operation. The generating step also includes generating color patches for a quality control target based on the quality control operation. The color patches are arranged in at least one row. The generating step also includes encoding metadata using measurement patches in a control strip within the target print job. The metadata includes a unique measurement request identifier. The method also includes printing the target print job at the printing device. The method also includes measuring the color patches of the quality control target of the target print job by detecting the metadata from the measurement patches of the control strip using a device. The metadata indicates the unique measurement request identifier. The measuring step also includes scanning the color patches for the at least one row. The measuring step also includes matching measured data for the scanned color patches to a unique row identifier. The method also includes uploading the measured data to a color management service.

A method for performing a quality control operation within a printing system is disclosed. The method includes generating a target print job having at least one row of color patches for the quality control operation and a control strip of measurement patches. The measurement patches include metadata encoded thereon. The method also includes printing the target print job at a printing device within the printing system. The method also includes detecting a unique measurement request identifier from the metadata within the control strip. The unique measurement request identifier specifies a measurement request type that corresponds to the quality control operation. The method includes enabling a user interface for the quality control operation based on the measurement request type. The method also includes displaying the target print job including the at least one row within the user interface. The method also includes measuring the at least one row of the target print job using a device to capture color data from the color patches. The measured color data is correlated with a unique row identifier and start and end markers determined from the metadata. The method also includes uploading the measured color data to a color management service to complete the quality control operation.

A color management system for a printing system is disclosed. The color management system includes a cloud-based color management service configured to generate a target print job for a quality control operation. The target print job includes a quality control target having at least one row of color patches for the quality control operation and a control strip of measurement patches encoding metadata for the quality control operation. The metadata includes a unique measurement request identifier. The color management system also includes a printing device to print the target print job. The color management system also includes a measurement device to capture color data from the color patches of the quality control target. The color management system also includes a computing device configured to detect the unique measurement request identifier from the metadata of the control strip. A measurement request type specified by the unique measurement request identifier corresponds to the quality control operation. The computing device also is configured to enable a user interface for the quality control operation based on the measurement request type. The computing device also is configured to display the quality control target including the at least one row within the user interface. The computing device also is configured to prompt an operator to measure the at least one row of color patches using the measurement device to capture the color data from the color patches. The measured color data is correlated with a unique row identifier and the start and end markers for the at least one row. The computing device also is configured to upload the measured color data to the color management service to complete the quality control operation.

BRIEF DESCRIPTION OF THE DRAWINGS

Various other features and attendant advantages of the present invention will be more fully appreciated when considered in conjunction with the accompanying drawings.

FIG. 3 illustrates a control strip for use in color measurement operations according to the disclosed embodiments.

DETAILED DESCRIPTION OF THE PREFERRED EMBODIMENTS

Figure 1A:
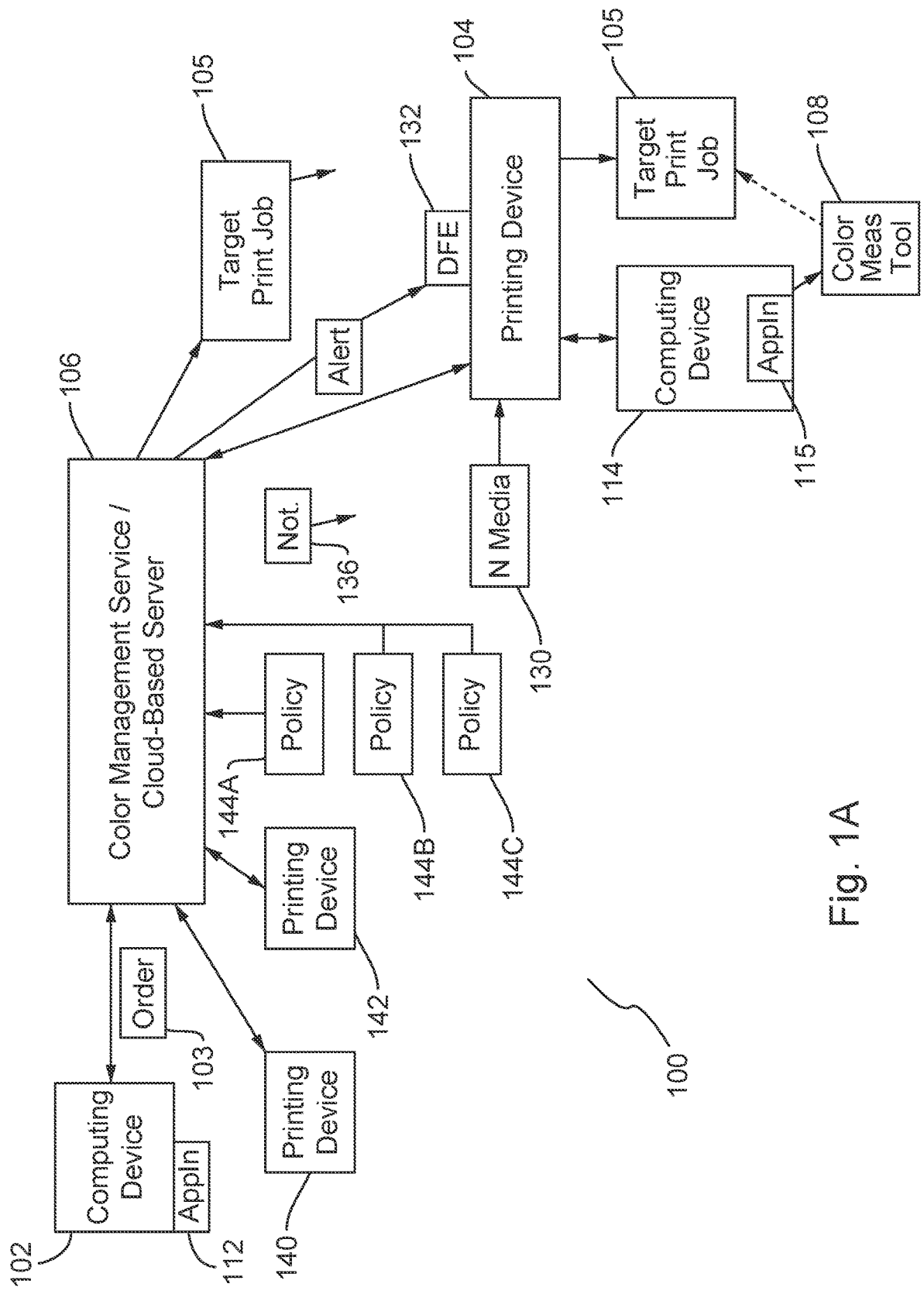
FIG. 1A illustrates a block diagram of a color management system for printing devices according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments may utilize the following definitions:

Printer calibration—a process for ensuring consistent color quality generated by printing devices.

Test color patch—an area, which may be rectangular, containing a single color on a test color sheet.

Test color strip—a series or row of test color patches on a printed test color sheet. Control strip—a test color strip that also contains encoded information.

Target print job—a printed page, containing rows of test color strips, used for printing device calibration.

Color measurement tool—a tool, such as a spectrophotometer, for measuring color patches on a test color sheet. The measurement data may consist of International Commission on Illumination (CIE) XYZ or CIELAB values. CIELAB may refer to a color space specified by the CIE to describe all the colors visible to the human eye that is used as a device-independent reference.

The disclosed embodiments enable a simplification to the process control target measurement process in order to better enable less experienced operators to properly perform process control operations. A centralized color management service may register all printing devices and define color management policies. Initial calibrations may be performed on a printing device. The color management system retains all the generated information as a baseline for the specific printing device. When the color management service determines that a quality control operation is required, it will alert the operator through the printing device or mobile device using an application.

The system automatically may submit the target print jobs for printing. Alternatively, when the operator is ready, he/she will tell the printing device to perform the quality control operation. The color management service will generate a target print job. The printing device will print the target print job with the required settings. In addition, the color management service will encode metadata using additional measurement patches on the target print job. After the target print job prints, the operator will measure the target within the print job. The measurements may be performed using a handheld spectrophotometer. Unlike other processes, the operator may measure rows in any order and in any direction. The metadata will indicate a unique measurement request identifier. Using the unique measurement request identifier, the disclosed embodiments may determine a measurement request type, a unique row identifier, and start and end indicators to process the measurement data for that row.

The system will use the measurement request type to change its user interface to look like the measurement target that the operator needs to measure. The user interface will prompt the operator to measure rows from the start of the measurement path. The measurement sequence, however, does not matter. Unlike conventional systems that either require that the operator measure rows in a specific order or use a measurement table and coordinates to identify patches, the disclosed embodiments work with hand held instruments and allow measurement of rows in any sequence. Once the operator has measured all rows in the measurement target, the disclosed embodiments will upload the measured data to the color management service.

The disclosed embodiments also include a provision for forcing the operator to perform the quality control request. If the operator does not print the measurement target within the time specified in the notification, then the disclosed embodiments may lock the printing device down to prevent printing of other jobs until the quality control operation is complete. The disclosed embodiments also may present the operator with a warning letting them know that he/she must measure the quality control target within a specified amount of time. If the operator does not complete the measurement operations within a specified time period, then the printing device also may be locked down until such operations are complete.

The disclosed embodiments better support quality control operations by less experienced operators without requiring that the print shop purchase expensive hardware. In addition to doing the usual notification that a quality control request is required, the disclosed embodiments enable "one click" printing of the required measurement targets. The operator does not need to know what quality control operation needs to be performed. He/she also does not need to know how the target print job should be printed. The color management system uses the baseline established by the administrator to perform all subsequent quality control operations.

The disclosed embodiments also enable error-free measurement without requiring the use of a measurement table or an inline spectrophotometer, which are both expensive options. The metadata stored in the patches allow the operator to measure rows in any sequence and in any direction. If needed, then the color management system can lock down the printing device until the measurement data is uploaded. This feature ensures that operators perform the quality control requests as required by the color management system.

FIG. 1A depicts a color management system 100 for printing devices 104, 140, and 142 according to the disclosed embodiments. Color management system 100 includes a centralized color management service 106. Color management service 106 may be a cloud-based server that registers all printing devices within system 100 and defines color management policies for the printing devices. Policies 144A, 144B, and 144C are shown for illustrative purposes. Color management service 106 may include any number of policies to manage the printing devices within system 100. Policies 144A, 144B, and 144C may pertain to quality control check and calibration frequency, color reproduction tolerances, and the like.

Policies 144A, 144B, and 144C may be referred to as quality control policies. The quality control policies define required quality control operations, such as calibrate, profile, quality check, and the like. They also may define a time frame for required operations to occur, such as perform a quality check daily by 9 am or opening of the facility. The policies also may define time frames for executing the quality control steps, such as print target print job 105 with XX time (30 minutes, 1 hour, and the like) and measure within XX time. Thus, system 100 can track both whether printing device 104 is within specification in that the colors are within defined tolerances. It also may track whether printing device 104 is in compliance. The required quality control operations are performed within the required time frames. Thus, policies within system 100 may track and enforce compliance with quality control operations as well as being within the specified tolerances for color printing operations.

The disclosed embodiments include printing device 104, which is used to illustrate the adaptive color measurement processes set forth below. In order to add printing device 104 to color management system 100, an administrator or other entity may register the printing device and perform an initial calibration on the printing device using N different media 130. N different media 130 may be defined or indicated when registration occurs. N different media 130 may include various paper media having reproductions normally used in production printing operations, such as halftone, color characterizations, and the like. Different media 130 also may include specific brands and styles of paper. Color printing between the different brands and styles may vary. Color management service 106 also may perform International Color Consortium (ICC) profiling for N different media 130 to define standards for the color printing operations. Color management system 100 may use color management service 106 to retain all of the above information as a baseline for a specific printing device, such as printing device 104.

In some embodiments, computing device 102 may include an application 112 that generates data for printing that is sent to color management service 106. Color management service 106 also may exchange data with printing device 104 for performing calibration operations, specifically color calibration. Color management service 106 is a server that manages print jobs and tasks between a plurality of printing devices 104, 140, and 142. Color management service 106 also provides calibration operations to the printing devices. A user may perform calibration tasks for the plurality of printing devices using color management service 106 from computing device 102.

Preferably, color management service 106 is a cloud-based service that allows for inspection, calibration, and profiling of color print jobs. Color management service 106 may act as a software as a service (SaaS) solution that provides color management from a cloud-based platform. The service enables repeatable color reproduction at the printing devices. Color management service 106 also may manage digital front ends (DFEs) from production printing which include paper catalogs. These paper catalogs may include paper measurements and paper color measurement profiles. For example, printing device 104 includes DFE 132.

In some embodiments, a user may request calibration for printing device 104 within system 100. The user may utilize application 112 on computing device 102 to generate order 103 to generate calibration data for printing device 104. Order 103 may include a request type, a printing device identification, and a media/paper identification. In order to ensure the best possible color reproduction, production printing devices may associate the retained color management profiles with specific paper media. Most printing devices may use hundreds of different paper types, with each paper resulting in printing and measuring color patches. Thus, the user may generate and send a large number of requests for calibrations of these different types of papers at once.

Color management service 106 receives order 103 for calibration of printing device 104 based on the provided information. Color management service 106 generates a target print job 105 to obtain calibration data for the paper at printing device 104. Target print job 105 is forwarded to printing device 104, which prints it out on the indicated paper/media type. An operator takes target print job 105. The operator, which also may be the user disclosed above, uses color measurement tool 108 and software application 115 to measure the color patches on target print job 105 to obtain calibration data.

In some embodiments, the operator may measure the color patches on target print job 105 by moving color measurement tool 108 over the appropriate parts of the sheet. The movement may be done by hand. In other embodiments, printing device 104 may perform these measurements using an inline measurement tool as opposed to a near-line measurement tool. A computing device 114 may execute software application 115 that receives data from color measurement tool 108 and processes the data for use in calibrating printing device 104. Application 115 may interface with color management service 106 to deliver the data thereto.

Computing device 114 may be a desktop computing device that runs application 115. In some embodiments, computing device 114 is part of printing device 104 such that application 115 executes on the printing device. Alternatively, computing device 114 may be a mobile device connected to printing device 104. The measurements may be performed by the printing device and sent to color management service 106 without the need for an operator.

Application 115 decodes the data provided by target print job 105 to identify it and the pertinent information to obtain the calibration data. These features are disclosed in greater detail below. The operator then uses color measurement tool 108 to measure the test color strips of test color patches on the sheet. The number of test color strips vary between different request types. When all test color strips are measured, application 115 uploads the measured data to color management service 106. Color management service 106 stores the uploaded information from application 115 until it can be processed.

In some embodiments, color management service 106 determines that a quality control operation is required. In these instances, color management service 106 may perform the following actions. It may push alert 134 to DFE 132 to let the operator know that a quality control operation is required. Alert 134 may provide information to the operator such as media/paper required for the quality control operation. As disclosed above, production printing devices may use a wide variety of paper types and styles. Alert 134 also may include a time period within which the operation must be performed. This time period may be defined by a policy, such as policy 144A.

Color management service 106 may execute the process of printing target print job 105 automatically. Alternatively, when the operator is ready, he/she may instruct printing device 104 to perform the quality control operation. Using the disclosed embodiments, color management service 106 may act without the operator specifying any print instructions, any measurement target, or the type of operation. Color management service 106 is able to correlate the initial calibration checks with the target print job or quality control operation. The operator does not have to do anything with the regard. Thus, potential mistakes from the operator are reduced or eliminated.

Color management service 106 generates target print job 105. As disclosed above, target print job 105 is sent to printing device 104 along with a request to print it with the required settings. These settings include the paper media used for the initial calibration disclosed above. Color management service 106 wants to maintain the conditions used in the initial calibration performed during registration. Further, the settings may include the proper color management settings for quality control requests, such as disable all color management and tone reproduction curves (TRCs) from other sources within printing device 104 or system 100.

In addition to the required settings, color management service 106 will encode metadata using additional measurement patches within target print job 105. The encoded metadata may include a unique measurement request identifier. Using the unique measurement request identifier, the disclosed embodiments may determine other information for scanning the target print job, such as a measurement request type, a type of quality control operation, a unique identifier for each measurement row, and start and end markers for each row. These features are disclosed in greater detail below.

After target print job 105 prints, the operator will measure the color patches within the target using color measurement tool 108. As noted above, color measurement tool 108 may be a handheld spectrophotometer or a measurement table. In order to measure the target color patches, the operator may move the spectrophotometer over the targets. Measurement application 115 or DFE 132 may prompt the operator to measure a row of color patches on target print job 105. When the operator measures a row, system 100 will use the patches to determine the unique measurement request identifier along with the measurement request type/type of quality control operation, the unique row identifier, and the start and end indicators to process the measurement data captured for that row.

Further, system 100 using color management service 106 may use the measurement request type to identify or change the user interface. The user interface may be displayed on computing device 114 or at printing device 104 on a panel or screen. The user interface will change so that it appears like the measurement target on target print job 105 that the operator needs to measure. A row that is measured by the operator may be marked with a measurement status. The user interface prompts the operator to measure rows from the start of the measurement path. This feature is disclosed in greater detail below.

In the disclosed embodiments, however, the measurement sequence of the rows on target print job 105 does not matter. The operator may measure any row as color management service 106 will be able to identify the row and update status on the proper row in the user interface. Unlike existing systems that use a measurement table and coordinates to identify the rows, the disclosed embodiments work with handheld instruments as color measurement tool 108. The row identification and start/end patches allow color management service 106 to both identify the row and identify all individual patches in the row. Once the user has measured all rows in the measurement target on target print job 105, system 100 will upload the data to color management service 106, where it may be processed per the usual color management system functionality.

System 100 also may provide the ability to force the operator to perform the quality control operation using target print job 105. Policies may be used to enable these features. For example, policy 144A may include a policy parameter that system 100 may lock down printing device 104 to prevent printing of other jobs until the quality control target is measured if the operator does not print target print job 105 within the time specified in the notification, or alert 134.

System 100 also may send a notification 136 to a manager. A notification 136 also may be sent to computing device 114 to alert the operator. Once printing device 104 prints target print job 105, system 100 will unlock the printing device and allow the operator to print other jobs. System 100 also may present the operator with a warning to let him/her know that the measurement operations for the quality control target must be done within a specific amount of time. Again, system 100 may lock printing device 104 down and send notifications if the user does not upload measurement data to color management service 106 within a certain amount of time.

Figure 1B:
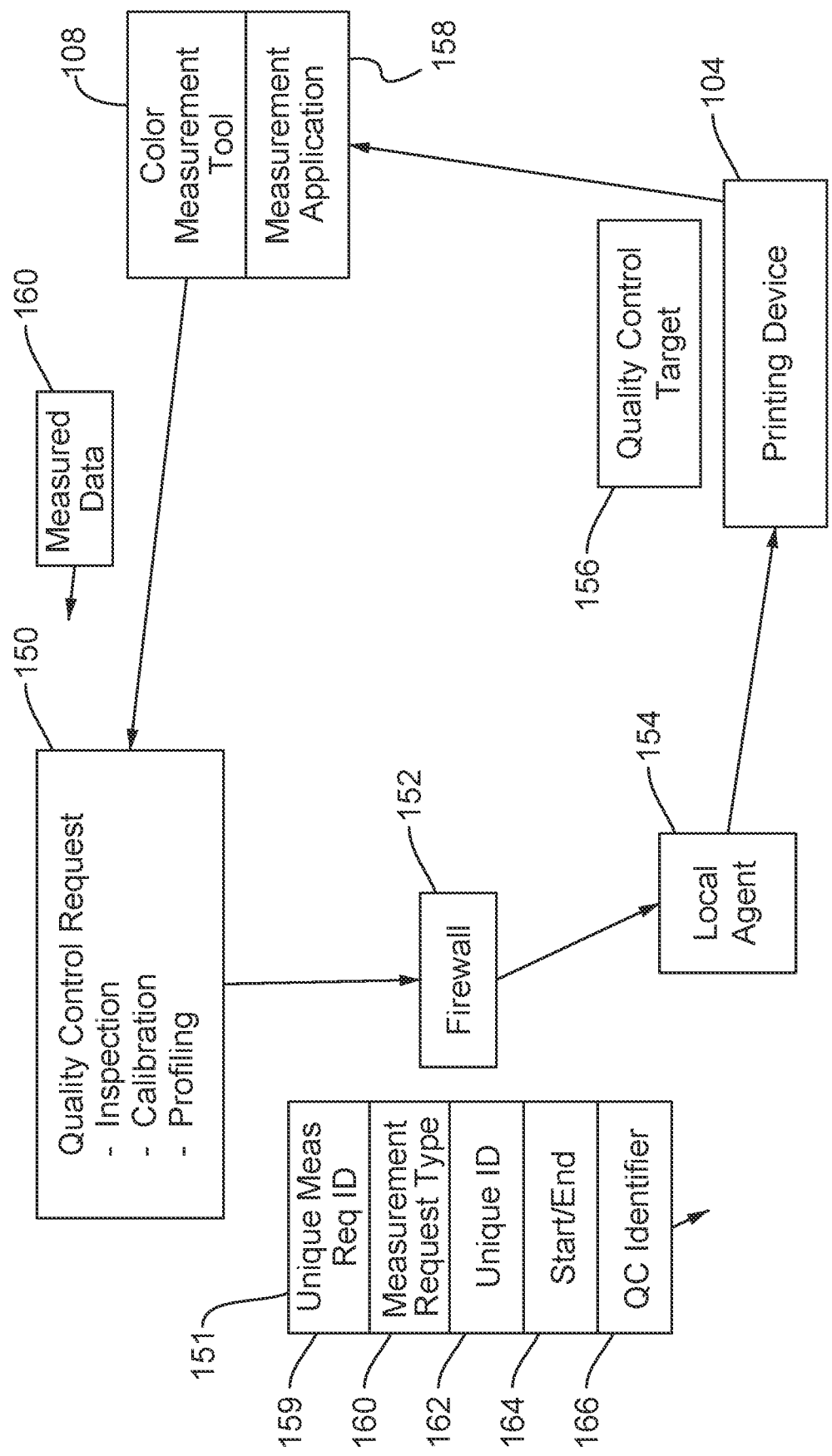
FIG. 1B illustrates a process flow within the color management system according to the disclosed embodiments.

FIG. 1B depicts a process flow within color management system 100 according to the disclosed embodiments. The features disclosed by FIG. 1B may be included in system 100 along with the features disclosed in FIG. 1A. The processes disclosed herein may be implemented as software that is installed locally within a network, such as for a customer. Quality control request 150 may be generated at color management service 106 to provide the baseline information for target print job 105. Quality control request 150 may be generated in response to a request from computing device 102 or initiated within system 100. A quality control request may be used to perform an inspection operation, a calibration operation, or a profiling operation at printing device 104.

Quality control request 150 may be generated according to the Exchange Job Definition Format (XJDF). XJDF allows systems from different vendors to operate in automated workflows. It acts as an interchange format used by a system of controllers, devices, and management information systems (MISs) to produce printed products. XJDF provides the ability to describe print jobs in terms of the products eventually to be created, as well as in terms of the work steps needed to create those products. XJDF may enable a syntax to specify the details of processes, which might be specific to the devices that execute the processes.

Quality control request 150 may include metadata 151 to encode into target print job 105. As disclosed above, metadata 151 includes unique measurement request identifier 159. Unique measurement request identifier 159 is encoded as color patches within target print job 105. System 100 correlates the measured data from the disclosed operations with the quality control request using the unique measurement request identifier. Metadata 151 also includes measurement request type, or type of quality control operation, 160, unique identifier 162 for each measurement row, and start and end markers 164 for each row.

Metadata 151 also may include quality control identifier 166 which may be encoded in a control strip or first row of color patches. It would require the operator to measure a specific row in order to determine measurement request type or quality control type 160, such as inspection, calibration, or profiling. An encoded quality control type 160 would work as system 100 could store measurement data from the measured rows in quality control target 156 of target print job 105 until quality control identifier 166 is identified. System 100 may then switch from generic prompts to measure individual rows to the information displayed by the user interface.

Color management service 106 may send quality control request 150 along with target print job 105 through firewall 152 to local agent 154. As color management service 106 may be a cloud-based, secured server that may print to another domain having printing device 104. Alternatively, color management service 106 may be an application installed in a server within a customer's network, or may be part of the DFE software. Thus, firewall 152 prevents access to the customer's network from outside sources. Local agent 154 may be a local server or device to connect with printing device 106. Printing device 104 receives target print job 105 and prints it out along with quality control target 156. In other words, quality control target 156 includes the color patches and other information to perform the quality control operation as set forth in quality control request 150.

The operator uses color measurement tool 108 to decode metadata 151 to enable the user interface to perform the requested operations using quality control target 156 of target print job 105. This process is disclosed in greater detail below. Color measurement tool 108 works in conjunction with measurement application 158 to measure color information from quality control target 156. Measured data 159 captured by color measurement tool 108 and processed by printing device 104 or mobile/computing device 114 are sent to color management service 106.

Figure 2:
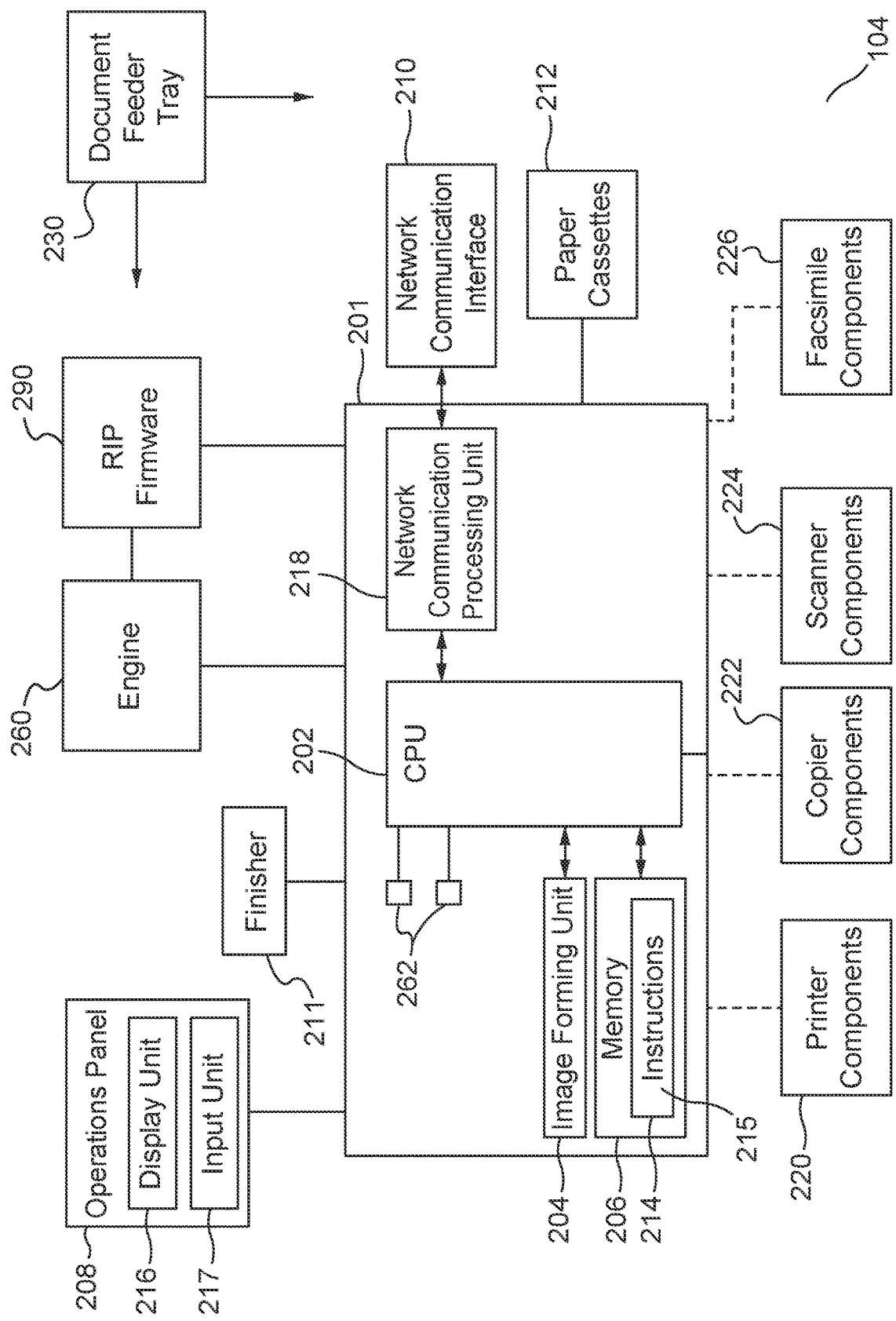
FIG. 2 illustrates a block diagram of components of a printing device according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from network service 106 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or network service 106. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with network service 106 via network communication interface 210 by utilizing a network protocol, such as the ones listed above. In some embodiments, printing device 104 communicates with network service 106 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from network service 106.

FIG. 3 depicts a control strip 300 encoded on a quality control target 156 of a target print job 105 according to the disclosed embodiments. Control strip 300 may be used in conjunction with color measurement tool 108 and application 115 to generate the information encoded in metadata 151 in order to perform the requested action. Control strip 300 includes color patches with encoded data. The encoded data may include unique measurement request identifier 159. Using the unique measurement request identifier, the disclosed embodiments can determine measurement request type 160, secondary unique identifier 162, as well as quality control identifier 166. The disclosed embodiments analyze control strip 300 to determine this information based on the data encoded in the color patches. This encoded information provides the basis to perform adaptive color measurements for printing device 104.

Unique measurement request identifier 159 may correspond to the specific target print job. The other parameters encoded in metadata 151 may be the same across a series of target print jobs. In other words, the target print jobs may use the same measurement request type, the same quality control identifier, such as calibration, unique row identifiers, and start and end markers. Each target print job, however, will have a unique measurement request identifier 159. For example, target print jobs may be sent to three printing devices. Each printing device will have its own unique measurement request identifier associate therewith. Another example may be target print jobs to the same printing device but using different types of paper. If there are 10 different types of paper, then there should be 10 unique measurement request identifiers. As the measured data is provided to color management service 106, it is associated with the unique measurement request identifier so that the system "knows" from the data came.

Control strip 300 contains measurement patches 1-20. Measurement patches 1-20 are color patches that may be reproduced for the quality control operation. In some embodiments, control strip 300 may include more or less than 20 measurement color patches. In FIG. 3, the different colors may be shown by the different graphic symbols with the patches. For example, measurement color patch 1 may be black, measurement color patch 2 may be cyan, measurement color patch 3 may be black, measurement color patch 4 may be red, measurement color patch 5 may be green, measurement color patch 6 may be cyan, measurement color patch 7 may be cyan, measurement color patch 8 may be yellow, measurement color patch 9 may be green, measurement color patch 10 may be black, measurement color patch 11 may be magenta, measurement color patch 12 may be magenta, measurement color patch 13 may be green, measurement color patch 14 may be black, measurement color patch 15 may be green, measurement color patch 16 may be magenta, measurement color patch 17 may be yellow, measurement color patch 18 may be black, measurement color patch 19 may be cyan, and measurement color patch 20 may be red.

In addition to the colors within measurement color patches 1-20, each patch may have a color intensity. The color intensity is used to encoded data within each patch. For example, a color patch may have a value of two bits—00, 01, 10, or 11, depending on the intensity of the color. As different colors may represent different data or information within system 100, the color intensity values may represent 4 different data values for that color. For example, color measurement tool 108 may be able to determine the following intensity values based on the color patches:

| Cyan- | 25% | 50% | 75% | 100% |
| Magenta- | 25% | 50% | 75% | 100% |
| Yellow- | 25% | 50% | 75% | 100% |
| Black- | 25% | 50% | 75% | 100% |
| Red- | 25% | 50% | 75% | 100% |
| Blue- | 25% | 50% | 75% | 100% |
| Green- | 25% | 50% | 75% | 100% |

These color patches may have these intensity values for different paper media as specified by order 103 or color management service 106. The above values may be used for white paper. The measured color intensity values from the color patches in control strip 300 are mapped to digital information to store two bits for each patch. For example, a color intensity of 25% may map to 00, a color intensity of 50% may map to 01, a color intensity of 75% may map to 10, and a color intensity of 100% may map to 11.

In other embodiments, other properties of the color patches in control strip 300 may be used to expand the amount of data stored in a patch. For example, the hue or luminosity of a color patch may be determined during measurement operations. For example cyan may encode 00, 01, 10 and 11. However, when the hue is considered, you may add a digit to encode cyan as 000, 001, 010, or 011. You may then encode magenta as 100, 101, 110 and 111. Two colors allow the encoding of 8 bits in the patches. The disclosed embodiments may use all primary and secondary colors, as disclosed above. Thus, each patch may encode 256 bits. In additional embodiments, more granular intensities may be used, such as 10% increments, to encode even more data in a patch.

In some embodiments, control strip 300 may encode the data for unique measurement request identifier 159 as well as measurement request type 160 and quality control request type identifier 166. System 100 may use this data to obtain the remaining information used to perform the color measurement operation for target print job 105. This additional information may include scanning mode, scanning direction, printing device information, and the like. It also may include the start and end markers used to denote that beginning and end of a row as well as the unique identifier for each row. This information may be used to configure the user interface displayed to the operator to perform color measurements using color measurement tool 108.

Thus, for example, information may be encoded using the color patches of control strip 300 by having a data associated with the color. Within the color patch, the intensity of the color (25%, 50%, 75%, 100%) may further delineate data for that color. As disclosed above, the color intensities may map to is and 0s so that each color can store 2 bits, or 4 different values. In some embodiments, any number of different variations may be used to encode data, such as hue or luminosity. A large number of different identifiers and request types may be stored using control strip 300. The different positions within control strip 300 also may indicate different data for use by system 100. For example, control strip 300 may include encoded data to identify the identifier for the quality control request, such as an order number, and an identifier for the quality control request type, such as a calibration operation using color measurement data.

Figure 4:
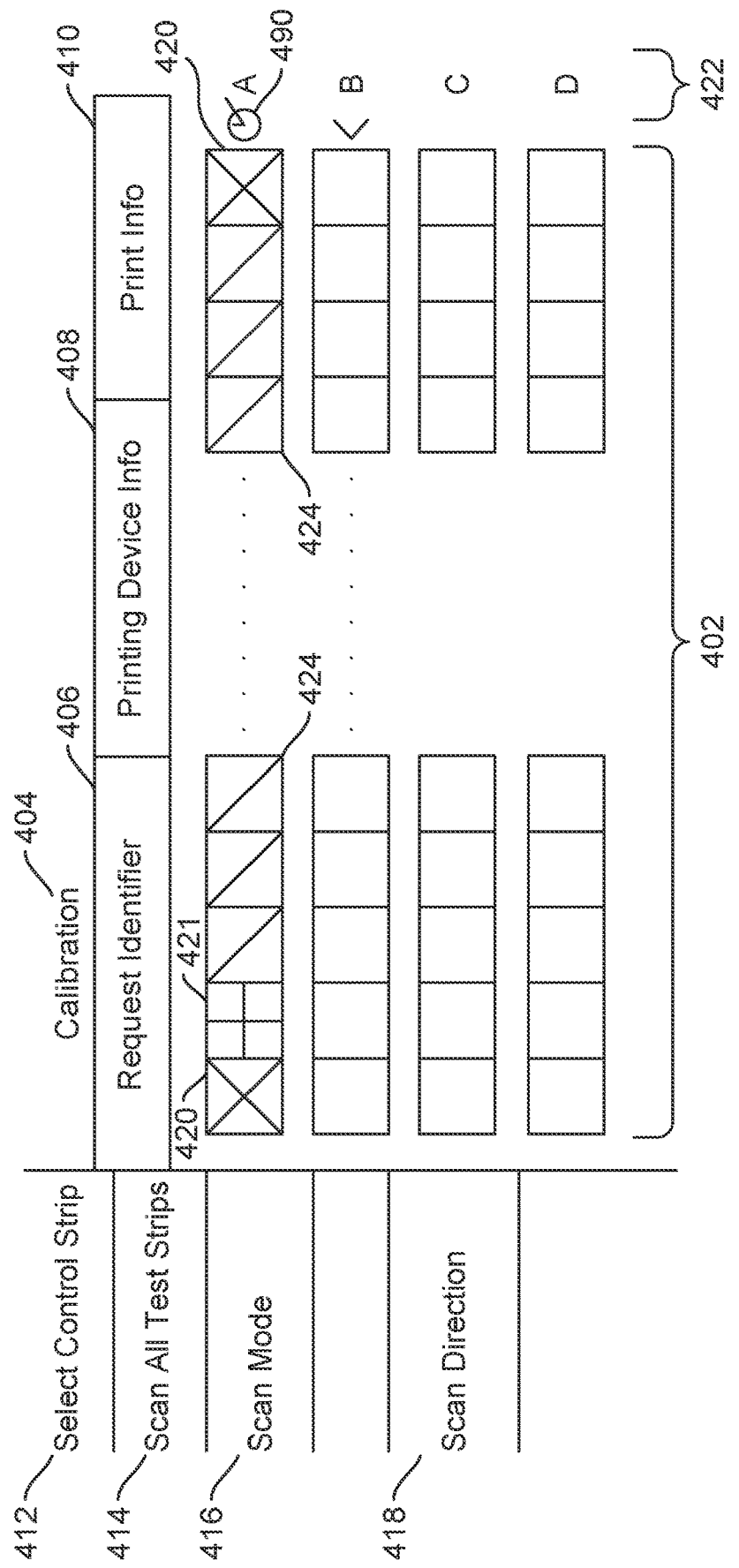
FIG. 4 illustrates a user interface for scanning a quality control target of a target print job according to the disclosed embodiments.

FIG. 4 depicts a user interface 400 displaying quality control target 156 for target print job 105 according to the disclosed embodiments. The data in control strip 300 is parsed to configure the information displayed by user interface 400. User interface 400 may be displayed on mobile/computing device 114 using application 115. Alternatively, user interface 400 may be displayed on panel 208 of printing device 104. User interface 400 may show the rows of color patches to be scanned using color measurement tool 108. Completed rows may be shown with the measured colors and intensities while rows not scanned are not shown with any color patches.

User interface 400 may display all or part of quality control target 156. Quality control target 156 includes color patches in target rows 402. FIG. 4 shows rows A, B, C, and D for target rows 402. Different target print jobs may result in different test color strips. The number of target rows 402 varies between different request types. Thus, measurement request type 160 may be used to generate the appropriate number of test color strips. For example, user interface 400 may display a measurement request, or quality control request, type 160 for a calibration operation. A calibration request may generate 4 target rows. A quality check request may generate fewer rows to be measured while an ICC check may include 5 pages of color patches to complete a measurement profile. All of this information may be encoded in control strip 300 so that the operator does not need to refer to anything in order to prepare the correct displayed information to perform the measurements of the color patches.

User interface 400, therefore, displays information about target print job 105 encoded in metadata 151 that is not necessarily printed on the print job. User interface 400 is configured accordingly to show different fields and actions. For example, quality control request type field 404 indicates that the target print job is for a calibration operation. Request identifier field 406 may indicate the unique measurement request identifier for the quality control request. Printing device information field 408 may include human-readable information for printing device 104. For example, the printing device information may include a name within the printing system, such as R&J K-Inkjet 03—Gardena, Calif., a model or type, such as TASKalfa Pro 15000C, or a serial or identification number, such as K3740-Y47521C. This information may be provided by color management service 106 after receiving the request to perform calibration operations. Print job information field 410 may include information regarding the type of paper or media used for the quality control request. For example, the type of paper used for target print job 105 may be EPSON Presentation Paper Matte 27LB. The disclosed embodiments also may use unique measurement request identifier 159 to retrieve this information from color management service 106.

Other fields include information about what stage in the process is user interface 400. For example, field 412 may be selected to display and scan control strip 300. After that is done, field 414 may be enabled to scan the rows of quality control target 156. The operator may click this field to begin measurements of the test color patches. Scan mode field 416 may indicate whether the scan mode is automatic or manual. For a manual scan mode, the operator may be prompted to use color measurement tool 108. Scan direction field 418 may indicate the scan direction to be used by the operator, such as alternating or left to right. This feature instructs the operator how to properly scan target rows 402. This information may be obtained after the information is decoded from control strip 300. The operator, due to control strip 300, does not have to manually enter this information into application 115 when collecting measurements of the color patches in target rows 402. The disclosed embodiments automatically retrieve the proper calibration references used in the measurements as well as associate the collected measurements to the proper request.

Target rows 402 also include color patches that provide specific information encoded in target print job 105. For example, start and end marker color patches 420 for the rows may be indicated by start and end markers 164. The encoded information indicates that color and intensity as well as any other distinguishing features for color patches that indicate the start and end of a target row. As the operator scans rows A through D, start and end marker color patches 420 provides the information to color measurement tool 108 that a new row is beginning or has ended. The operator does not need to manually indicate such during scanning operations.

Further, target print job 105 includes a unique identifier 162 for each measurement target row. User interface 400 may display the unique identifier information as row information 422. A color patch 421 within the appropriate row may provide its unique identifier so that system 100 can match the measured row to the rows in user interface 400. The measured color target data for the color patches within the row is associated with the unique identifier encoded by color patch 421. As target rows are scanned, the scanned information may be displayed or shown as completed such as scanned color patches 424 in target row A. The other target rows have not been scanned so they do not include scanned color patches.

User interface 400 will prompt the operator to measure target rows A-D from the start of the measurement path. The measurement sequence, however, does not matter. The operator may measure any target row as system 100 is able to identify the row and update status on the proper row in user interface 400. Unlike conventional systems that use a measurement table and coordinates to identify the rows, the disclosed embodiments work with color measurement tool 108, which is a hand held instrument. The row identification and start and end color patches allow system 100 to both identify the row and identify individual color patches within the row.

Referring back to FIG. 1B, color measurement tool 108 and application 115 are used to capture the measured values for the color patches in target rows A-D according to the disclosed embodiments. Color measurement tool 108 measures the values for the color patches of quality control target 156. As disclosed above, the operator may move color measurement tool 108 over the color patches to measure the colors used in test color sheet 105. This data may be provided to color management service 106 as measured data 160 associated with unique measurement request identifier 159. Measured data 160 may be processed per usual color management system functionality.

Figure 5:
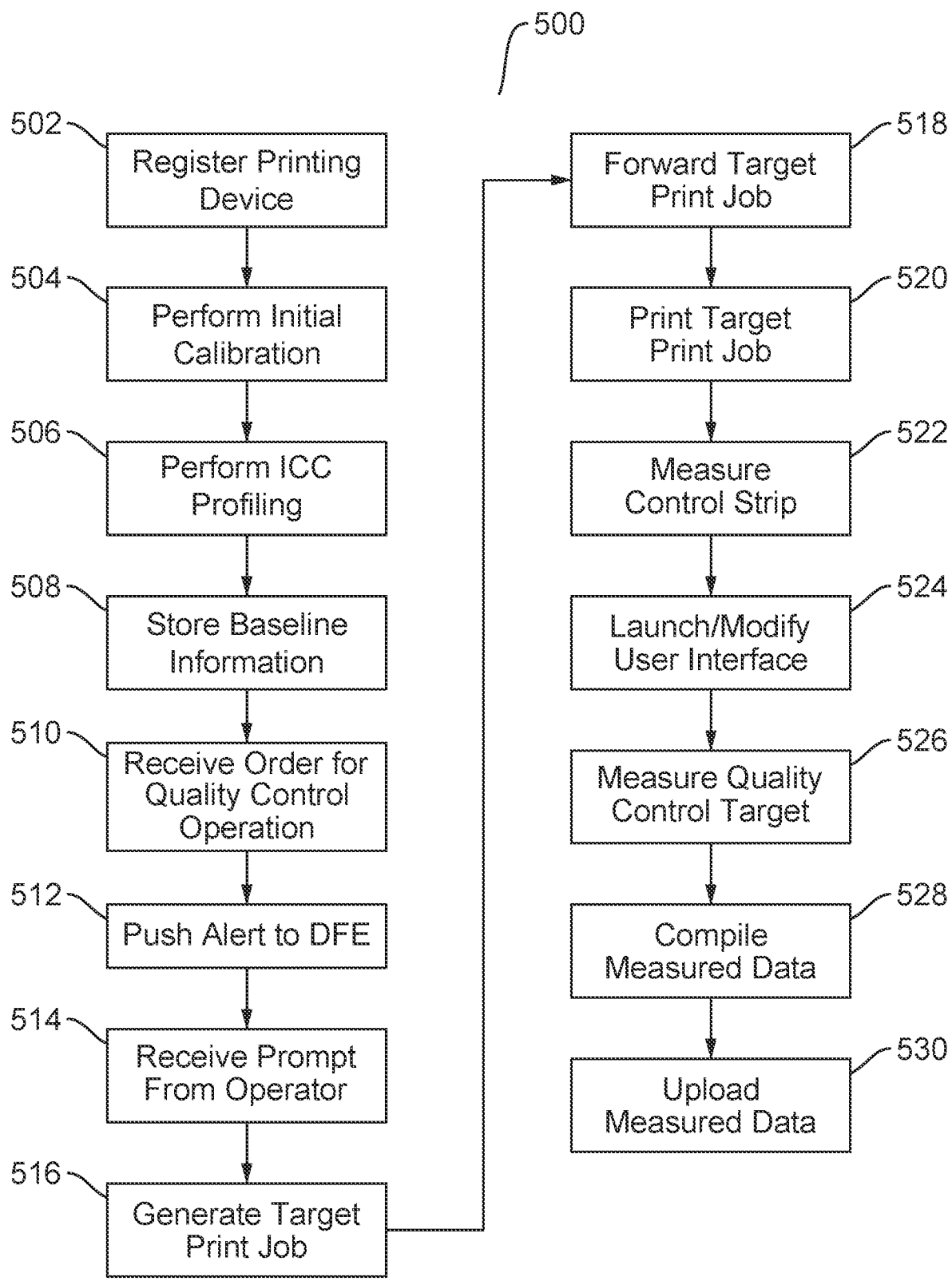
FIG. 5 illustrates a flowchart for performing a quality control operation using the color management system according to the disclosed embodiments.

FIG. 5 depicts a flowchart 500 for performing a quality control operation using color management system 100 according to the disclosed embodiments. Reference may be made to FIGS. 1A-4 for illustrative purposes in disclosing the embodiments of flowchart 500. Flowchart 500, however, is not limited to the features disclosed by FIGS. 1A-4.

Step 502 executes by registering printing device 104 with color management service 106. Printing device 104 may include a unique address within color management system 100, such as an IP address or network address. Further, printing device 104 may include specific information for that device, such as name, serial number, model, brand, and the like. As shown in FIG. 1A, color management service 106 may register multiple printing devices.

Step 504 executes by performing an initial calibration on each printing device registered to color management service 106. Referring to printing device 104, initial calibration may occur for several different types of media, or N media 130, as defined by system 100 or an administrator. Printing device 104 may be a commercial printing device that works with many different types of media, such as different paper types and sizes, and performs different characterizations of items printed thereon. An operator may perform the initial calibration operations at printing device 104. Step 506 may optionally execute by performing ICC profiling for N different media 130 as well. The ICC profile may define the different standards for color profiling at printing device 104. Step 508 executes by storing the initial calibration information, or baseline information, at color management service 106.

Step 510 executes by receiving order 103 at color management service 106 for performance of a quality control operation, such as calibration, inspection, or profiling. Step 512 may optionally execute by pushing alert 134 to DFE 132 of printing device 104. System 100 also may automatically submit the job to print. Alert 134 informs the operator that the quality control operation is required at printing device 104. Alert 134 may provide information to the operator of the media required for the quality control operation and the time that the operation is to be performed. Alert 134 also instructs DFE 132 to perform the quality control operation. Step 514 executes by receiving a prompt or instruction from the operator to inform color management service 106 that printing device 104 is ready to perform the quality control operation. For example, the operator may need to load the specified media within printing device 104 or set it up for color printing.

Step 516 executes by generating target print job 105 that include quality control target 156 at color management service 106. Color management service 106 may use the information collected in the initial calibration steps to generate quality control target 156. Preferably, the color printing capabilities of printing device 104 has not degraded significantly since the initial calibration operations. This step is disclosed in greater detail by FIG. 6 below. Step 518 executes by forwarding target print job 105 from color management service 106 to printing device 104. Printing device 104 may be configured to print target print job 105. Step 520 executes by printing target print job 105 at printing device 104. Preferably, target print job 105 includes quality control target 156 printed on the specified media.

Step 522 executes by measuring control strip 300 within quality control target 156. As disclosed above, control strip 300 may be scanned using a color measurement tool 108. Also noted above, color measurement tool 108 may be a spectrophotometer, which is a handheld device used by the operator to capture the colors and intensities of the color patches within control strip 300. Using the captured information, system 100 may decode the color patches to obtain metadata 151 encoded therein. This information may include unique measurement request identifier 159 from which the disclosed embodiments may determine measurement request type 160, unique row identifier 162, start and end markers 164, and quality control identifier 166. As disclosed above, control strip 300 may use a plurality of colors, intensities, hues, luminosities, and the like of the different colors to encode information that provides instructions and information on how to proceed with the quality control operation.

Step 524 executes by launching or modifying user interface 400 used to perform the quality control operation. User interface 400 may be displayed on mobile/computing device 114 or printing device 104. User interface 400 may display the measurement target to be measured. A row that has been measured may be marked with a measurement status. Referring back to FIG. 4, row A is indicated as being measured as its scanned color patches are displayed. Further, an indicator 490 shows that the row is scanned and measurement values captured.

Step 526 executes by measuring the target rows and color patches of quality control target 156. User interface 400 may prompt the operator to measure rows from the start of the measurement path. The measurement sequence may not matter as the operator may measure or scan any row as system 100 will be able to identify the row and update its states in user interface 400 by use of the metadata encoded in the row. Step 528 executes by compiling the captured data of the colors and intensities of the color patches at mobile/computing device 114. Application 115 may process the data as needed or into a desired format. Further, application 115 may perform an integrity check to make sure all the color patches and information within quality control target 156 is captured. Step 530 executes by uploading measured data 160 to color management service 106 to complete processing according to the quality control operation. Measured data 160 are uploaded with unique measurement request identifier 159 to indicate which target print job is providing the information. Color management service 106 may indicate that the specific target print job is completed based on unique measurement request identifier 159.

Figure 6:
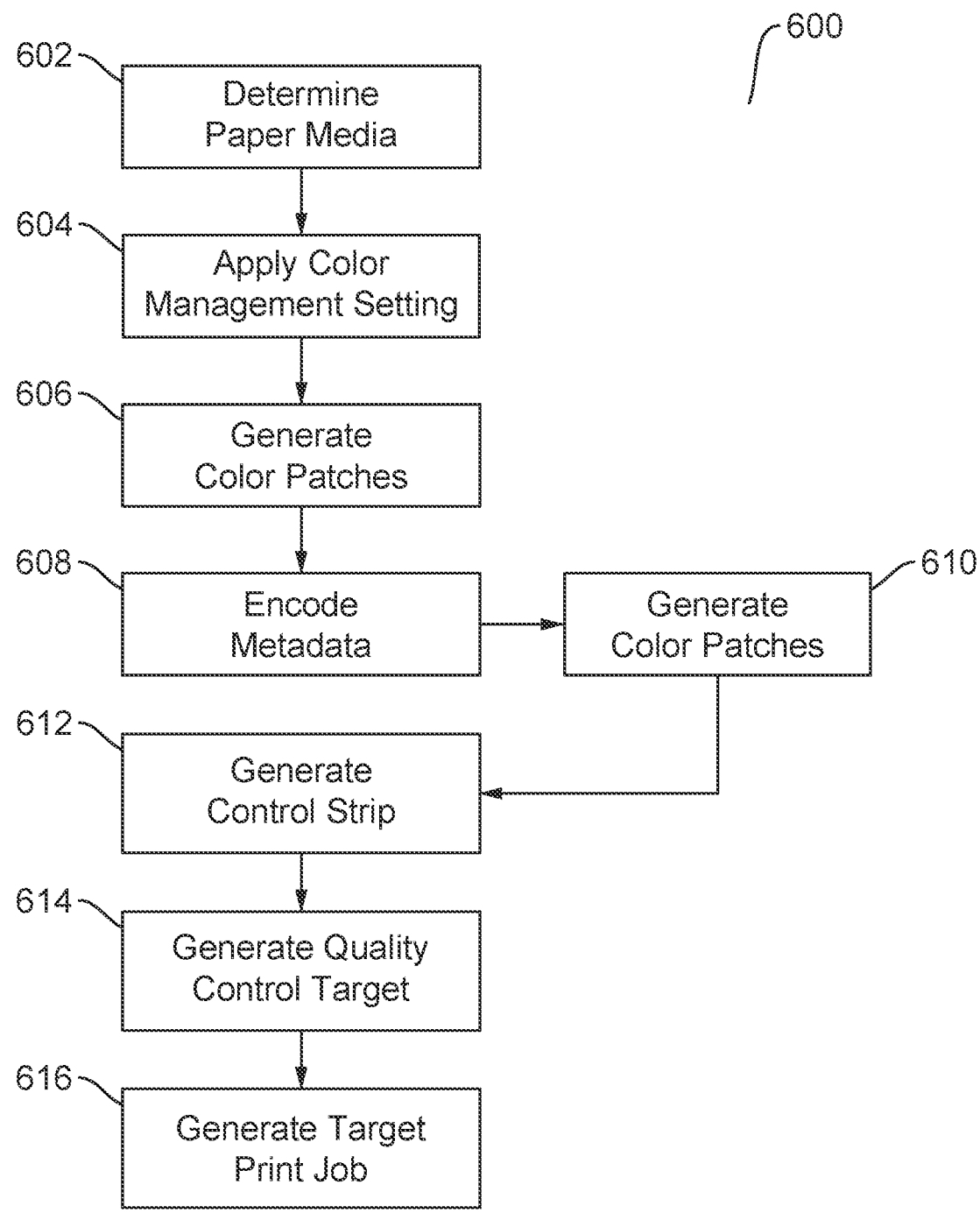
FIG. 6 illustrates a flowchart for generating a target print job having encoded metadata according to the disclosed embodiments.

FIG. 6 illustrates a flowchart 600 for generating target print job 105 having encoded metadata 151 according to the disclosed embodiments. Reference may be made to FIGS. 1A-5 for illustrative purposes in disclosing the embodiments of flowchart 600. Flowchart 600, however, is not limited to the features disclosed by FIGS. 1A-5. Flowchart 600 also may pertain to step 516 of flowchart 500, disclosed above.

Color management service 106 may receive order 103 to perform a quality control operation. Alternatively, color management service 106 may periodically perform the quality control operation to maintain the color printing capabilities of the printing devices within system 100. In any event, a target print job 105 is generated at color management service 106 to perform the quality control operation.

Step 602 executes by determining a paper media for the quality control operation. The paper media used for the operation will match the media used for the initial calibration. As noted above, N different media 130 are used to do the initial calibrations. Thus, the paper media used for the quality control operation should be one of the N different media. Step 604 executes by applying a color management setting for quality control requests. For example, a color management setting may disable all color management and tone reproduction curves.

Step 606 executes by generating color patches to be used as target colors within quality control target 156. The number of color patches depends on the type of quality control request. For example, a quality check may generate 2-3 rows of color patches while ICC profiling may generate over a thousand color patches.

Step 608 executes by encoding metadata 151 using measurement color patches 1-20 in control strip 300. Metadata 151 includes unique measurement request identifier 159. The values for metadata 151 may be encoded using the different colors available for the quality control operation as well as the intensities of the colors. As disclosed above, each measurement color patch will encode at least two bits along with its color to provide a value for metadata 151 in control strip 300. In some embodiments, the use of a color may result in 4 or more distinct values. Step 610 executes by generating measurement color patches 1-20 for control strip 300. Thus, measurement color patches 1-20 are not generated based on the initial calibration data obtained above, but on unique metadata information corresponding to the quality control operation. Step 612 executes by generating control strip 300 to be placed within target print job 105.

Step 614 executes by generating quality control target 156 having the color patches generated above in the rows. Step 616 executes by generating target print job 105 having control strip 300 and quality control target 156 at color management service 106. Target print job 105 may be stored at color management service 106 until requested by the operator to be sent to printing device 104.

Figure 7:
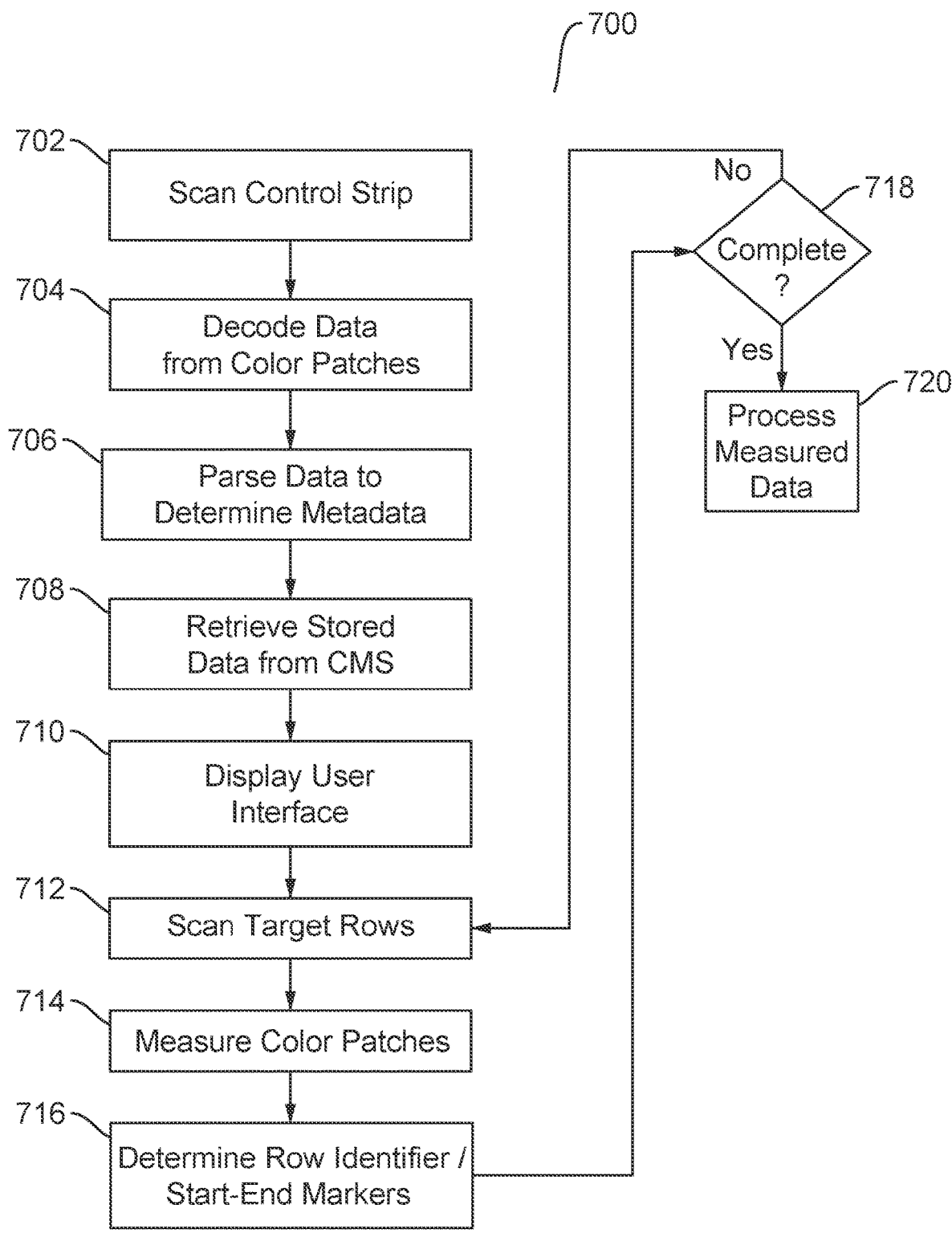
FIG. 7 illustrates a flowchart for measuring color patches according to the disclosed embodiments.

FIG. 7 illustrates a flowchart 700 for measuring color patches according to the disclosed embodiments. Reference may be made to FIGS. 1A-6 for illustrative purposes in disclosing the embodiments of flowchart 700. Flowchart 700, however, is not limited to the features disclosed by FIGS. 1A-6. Flowchart 700 also may correspond to steps 522-526 of flowchart 500.

Step 702 executes by scanning control strip 300 using color measurement tool 108. The operator may move color measurement tool 108 over control strip 300 that is printed with target print job 105. Step 704 executes by decoding data from the scanned color patches. As disclosed above, the data may include a color and a color properties that corresponds to a value. For example, the color patch may be cyan with a color intensity of 50%. The disclosed embodiments can measure the difference in color, or Δe. These differences can represent different values within the measurement color patches. Thus, the measured color patch may represent a value of 10, or two bits, for the color cyan, which also may correspond to another value or type of data. Other encoding operations may be used, as disclosed above.

Step 706 executes by parsing the decoded data to determine metadata 151 encoded within target print job 105. The data string decoded for the color patches of control strip 300 may be parsed to determine the required metadata to complete the quality control operation. For example, the disclosed embodiments may identify unique measurement request identifier 159 from the data of color patches 1-15 of control strip 300. The remaining data may be used to identify measurement, or quality control, request type 160, unique row identifier 162, and start and end markers 164. A quality control identifier 166 also may be parsed from the decoded data.

Step 708 executes by retrieving stored data from the quality control operation from color management service 106. Not all information pertaining to the quality control operation will be encoded in control strip 300. Measurement request type 160 may be used to obtain the other information needed to process quality control target 156. In some embodiments, the rest of the metadata may be obtained by using measurement request type 160. As disclosed above, this information may include whether to scan using alternate rows and to scan left to right.

Step 710 executes by displaying user interface 500 in accordance with measurement request type 160. User interface 400 will resemble the measurement target that the operator needs to measure. Preferably, quality control target 156 is displayed within user interface 400 along with row information 422 as well as indicators 490. This feature allows the operator to view the measurement target without having to load or copy anything to user interface 400. It is automatically retrieved. Step 712 executes by scanning the target rows of quality control target 156, such as rows A-D disclosed above. Step 714 executes by measuring the color patches within the target rows.

Step 716 executes along with steps 712 and 714 to determine unique row identifier 162 for each target row and start and end markers 164 to indicate where the row begins and ends. These may be seen as color patches 420 in FIG. 4. The operator may be informed the row is completed scanned by identifying the start and end markers for that row. In an alternate embodiment, system 100 would only use start identifiers. The operator knows the scan direction based on whether the start identifier is the first or last patch that was scanned. These markers also inform system 100 of the scan direction so that each patch can be uniquely identified. This feature allows the operator to scan in either direction. Further, color patch 421 may indicate the row identifier that matches row information 422 for that row. This feature allows the operator to scan rows in any order. It also prevents errors from scanning a row twice or from skipping a row unintentionally. The disclosed embodiments may store the measured data from the scanned color patches along with unique row identifier.

Step 718 executes by determining whether scanning is complete, or if all target rows have been scanned. User interface 400 may indicate when a row is completely scanned based on the rows detected metadata. Once complete, user interface 400 may indicate as such. If step 718 is no, then flowchart 700 returns to step 712 to continue scanning target rows. If step 718 is yes, then step 720 executes by processing measured data 160 for quality control target 156, as indicated by unique measurement request identifier 159. The differences in the color intensities detected versus the expected color intensities may be determined, or Ae. Measured data 160 may then be uploaded to color management service 106.

Figure 8:
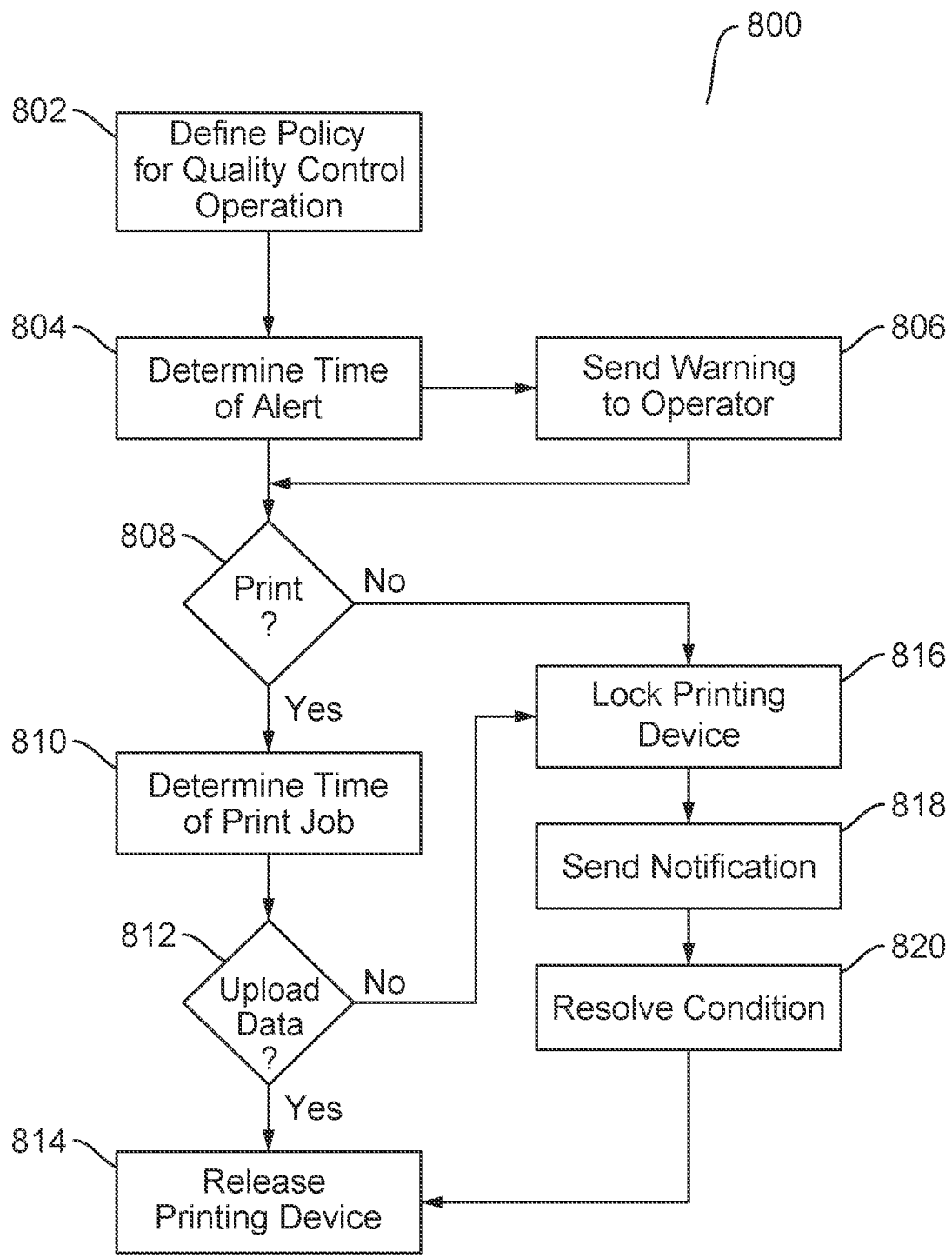
FIG. 8 illustrates a flowchart for using a policy to perform the quality control operation according to the disclosed embodiments.

FIG. 8 illustrates a flowchart 800 for using a policy 144A to perform the quality control operation according to the disclosed embodiments. Reference may be made to FIGS. 1A-7 for illustrative purposes in disclosing the embodiments of flowchart 800.

Flowchart 800, however, is not limited to the features disclosed by FIGS. 1A-7.

Step 802 executes by defining the appropriate policy for the requested quality control operation. Potential quality control operations include calibration, inspection, profiling, quality check, and the like. A policy may define the parameters for a type of quality control operation. For example, a quality control check may be completed in a shorter time frame than a calibration. Thus, color management service 106 may define or determine the applicable policy, such as policy 144A, to apply for the quality control operation.

Step 804 executes by determining a time at which alert 134 is sent to printing device 104 or the operator using application 115. Color management service 106 may note the time in order to begin the time period to print target print job 105 according to policy 144A. Step 806 executes by sending a warning to the operator to print target print job 105 within the specified period of time according to policy 144A based on the determined time of alert 134. In some embodiments, printing may be performed automatically and the warning may be about releasing the target print job or about measuring the target print job in a required timeframe, as disclosed below.

Step 808 executes by determining whether the operator printed target print job 105 at printing device 104. This step may be repeated periodically. In other words, color management service 106 may check to see if it received a response that target print job 105 has been printed. If step 808 is yes, then step 810 executes by determining the time of printing target print job 105. Color management service 106 will monitor the progress of the quality control operation to ensure it is completed within the time period specified by policy 144A. Again, a warning may be sent to the operator to open user interface 400 and scan the color patches of quality control target 156.

Step 812 executes by determining whether measured data 160 from the scanned color patches of the quality control operation has been uploaded to color management service 106. If yes, then step 814 executes by releasing printing device 104 from the quality control operation, if needed. Certain operations on printing device 104 may be halted until the quality control operation is complete. If so, then these operations may be resumed.

If step 808 or step 812 is no, then the time period parameters of policy 144A have not been met. Flowchart 800 proceeds to step 816, which executes by locking down printing device 104. This operation may prevent printing of other jobs until target print job 105 is printed or the quality control operation is completed, whichever is applicable. Step 818 executes by sending a notification 136 to the operator to complete printing target print job 105 or perform the quality control operation. A notification also may be sent to a manager or administrator. Step 820 executes by resolving the condition causing the lockdown of printing device 104. Target print job 105 is printed or measured data is uploaded to color management service 106 to resolve the delinquent condition in performing the quality control operation. Flowchart 800 then proceeds to step 814 to release printing device 104 and continue printing.

For example, policy 144A may provide a time period of 30 minutes to print a target print job 105 for a calibration quality control operation and a time period of 60 minutes to complete scanning the color patches of the target rows and uploading the measured data. Color management service 106 sends alert 134 at 1300 to the operator. The operator prints target print job at 1320 to avoid locking down printing device 104. It should be noted that the lockdown is optional. Then, the operator has until 1420 to complete the quality control operation and upload the measured data. At 1420, color management service 106 determines the measured data is not received and sends an instruction to printing device 104 to lock down and prevent further print jobs. The operator is notified and completes the quality control operation at 1440. Color management service receives the measured data and releases printing device 104. Target print jobs may be tracked using unique measurement request identifiers 159.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media.

The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for adaptive color measurement within a printing system, the method comprising:
   generating a target print job for a quality control operation at a printing device by determining a paper media for the quality control operation,
     generating color patches for a quality control target based on the quality control operation, wherein the color patches are arranged in at least one row, and
     encoding metadata using measurement patches in a control strip within the target print job, wherein the metadata includes a unique measurement request identifier;
   printing the target print job at the printing device;
   measuring the color patches of the quality control target of the target print job by detecting the metadata from the measurement patches of the control strip using a device, wherein the metadata indicates the unique measurement request identifier, scanning the color patches for the at least one row, and matching measured data for the scanned color patches for the at least one row to a unique row identifier;

locking down the printing device if the printing step is not performed according to a policy; and uploading the measured data to a color management service.

2. The method of claim 1, wherein encoding the metadata includes encoding a measurement request type for the target print job.

3. The method of claim 1, further comprising encoding the unique row identifier within the at least one row.

4. The method of claim 1, further comprising encoding start and end markers for the at least one row.

5. The method of claim 4, further comprising decoding the start and end markers for the at least one row during scanning the color patches for the at least one row.

6. The method of claim 1, further comprising performing an initial calibration on the printing device using a plurality of different media including the paper media for the quality control operation, wherein calibration data generated by the initial calibration is used for the target print job.

7. The method of claim 1, wherein detecting the metadata includes decoding encoded values from the measurement patches.

8. The method of claim 1, further comprising sending a warning within the printing system that a parameter of the policy has not been met and that the printing device is locked down.

9. A method for performing a quality control operation within a printing system, the method comprising:
generating a target print job having at least one row of color patches for the quality control operation and a control strip of measurement patches, wherein the measurement patches include metadata encoded thereon;
printing the target print job at a printing device within the printing system;
detecting a unique measurement request identifier from the metadata within the control strip, wherein the unique measurement request identifier specifies a measurement request type that corresponds to the quality control operation;
enabling a user interface for the quality control operation based on the measurement request type;
displaying the target print job including the at least one row within the user interface;
measuring the at least one row of the target print job using a device to capture color data from the color patches, wherein the measured color data is correlated with a unique row identifier and start and end markers determined from the metadata; and
uploading the measured color data to a color management system to complete the quality control operation.

10. The method of claim 9, further comprising prompting a user to perform the measuring step via the user interface.

11. The method of claim 9, further comprising wherein enabling includes modifying the user interface according the measurement request type.

12. The method of claim 9, further comprising encoding the metadata within the measurement patches using a color intensity or hue value for each measurement patch.

13. The method of claim 12, further comprising detecting the color intensity or hue value for each measurement patch using the device.

14. The method of claim 13, further comprising switching to the user interface upon detecting the control strip within the target print job.

15. The method of claim 9, further comprising locking down the printing device if the measuring step is not performed according to a policy.

16. The method of claim 15, further comprising unlocking the printing device once the measuring step is complete.

17. A color management system for a printing system comprising:
a color management service configured to
generate a target print job for a quality control operation, wherein the target print job includes a quality control target having at least one row of color patches for the quality control operation and a control strip of measurement patches encoding metadata for the quality control operation, wherein the metadata includes a unique measurement request identifier;
a printing device to print the target print job;
a measurement device to capture color data from the color patches of the quality control target; and
a computing device configured to
detect the unique measurement request identifier from the metadata of the control strip, wherein a measurement request type specified by the unique measurement request identifier corresponds to the quality control operation;
enable a user interface for the quality control operation based on the measurement request type;
display the quality control target including the at least one row within the user interface;
prompt an operator to measure the at least one row of color patches using the measurement device to capture the color data from the color patches, wherein the measured color data is correlated with a unique row identifier and start and end markers for the at least one row; and
upload the measured color data to the color management service to complete the quality control operation.

18. The color management system of claim 17, wherein the computing device is a mobile device coupled to the printing device.

19. The color management system of claim 17, wherein the computing device is within the printing device.

* * * * *